May 23, 1961 M. A. SCHULTZ 2,985,030
TRANSMISSION CONTROL
Filed April 25, 1957 2 Sheets-Sheet 1

INVENTOR.
Melvin A. Schultz
BY
W. C. Middleton
ATTORNEY

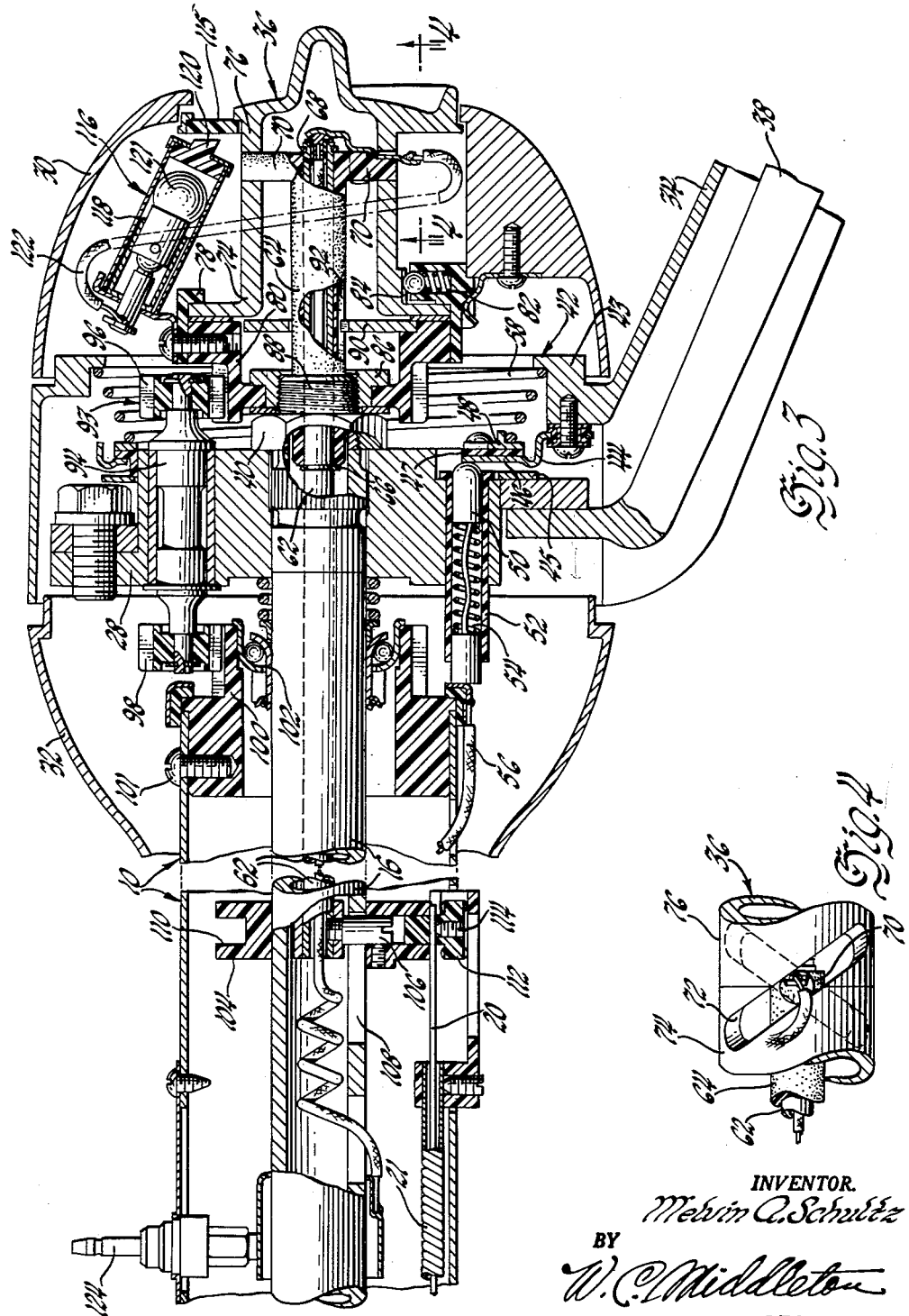

United States Patent Office 2,985,030
Patented May 23, 1961

2,985,030
TRANSMISSION CONTROL

Melvin A. Schultz, Saginaw, Mich., assignor to General Motors Corporation, Detroit, Mich., a corporation of Delaware Filed Apr. 25, 1957, Ser. No. 655,060

15 Claims. (Cl. 74—484)

This invention relates to improvements in motor vehicle transmission controls and particularly transmission controls adapted for installation on the vehicle steering column.

It is always desirable to make manually operated controls for a motor vehicle more accessible to the operator. One of such controls, the transmission selector lever, is more convenient to the vehicle driver if positioned above the steering wheel hub rather than as is customary below the steering wheel hub. In repositioning the transmission selector lever or control member, it is advantageous not to have to revise the steering shaft and associated mechanism. Then, the problem is one of transfer of motion from the transmission control member to the transmission. Also, if the transmission control shaft is disposed inside the steering shaft, the transmission control shaft and the transmission must be connected through the steering shaft without interfering with the operation of either the steering wheel or the transmission control member.

With this problem in mind, it is now proposed to locate the transmission control member in a position more accessible to the vehicle operator above the steering wheel hub and to connect such member through the steering wheel to the transmission without interfering with the operation of the steering wheel or altering the steering shaft and associated mechanism. Specifically, novel interconnections both between the manually operated transmission control member and a transmission control shaft and through the steering shaft between the transmission control shaft and a transmission are provided. By these interconnections rotational movement of the transmission control member is transformed into axial movement of the transmission control shaft without interfering with the independent movement of the steering shaft and the transmission control member.

In carrying out the invention, the transmission control shaft is positioned within the steering shaft and both shafts are mounted inside a steering column. The manually operated control member is disposed above the steering wheel hub and is interconnected with the transmission control shaft through a guide surface. Rotational movement of the transmission control shaft is prevented by planetary gearing which extends through the steering wheel. Consequently, the guide surface upon rotation of the control member causes the transmission control shaft to be moved axially. A transfer member slidable relative to the steering shaft interconnects the transmission and the transmission control shaft through the steering shaft.

The foregoing and other objects and advantages will be more apparent from the following description and from the accompanying drawings in which:

Figure 3 is a sectional view along the line 3—3 of Figure 2;

Figure 4 is a view along line 4—4 depicting diagonal slots constructed according to a preferred form of the invention.

Figure 1:
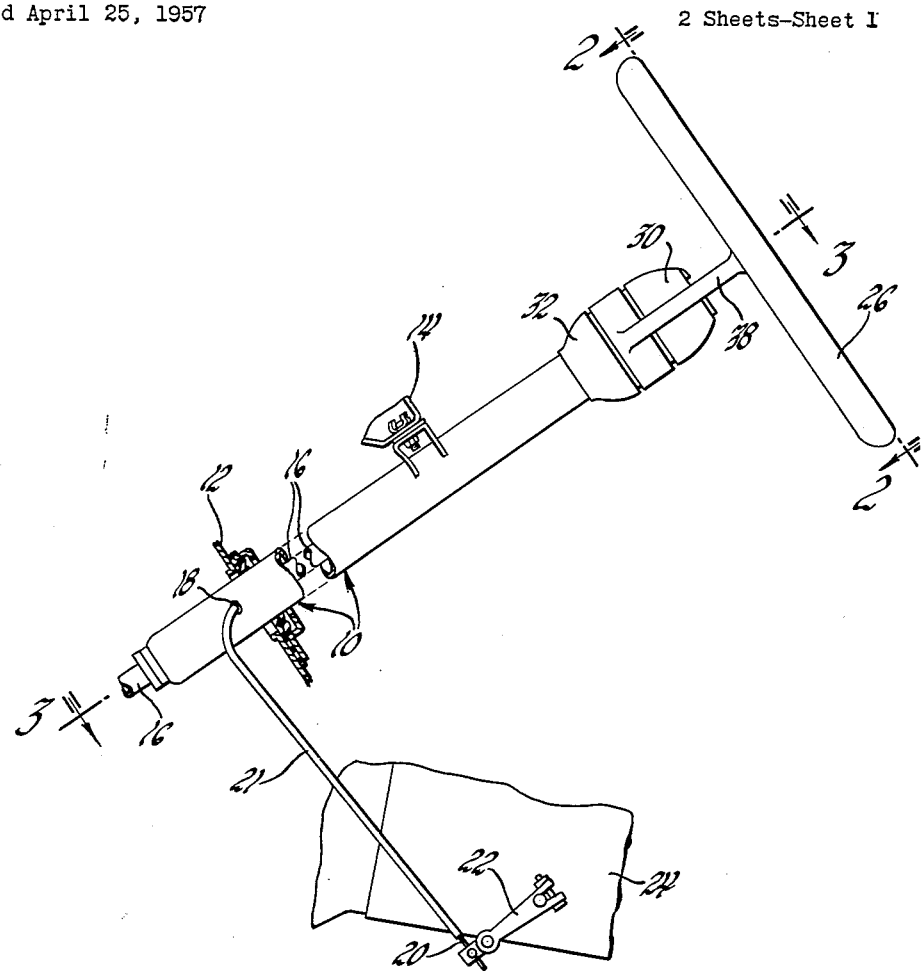
Figure 1 is an elevational view of a steering column with controls for a steering shaft and a transmission arranged thereon according to the invention.

Figure 1 illustrates a steering column 10, supported by upper and lower brackets 12 and 14, and which houses and rotatably supports a hollow steering shaft 16. At the lower end of the column 10, a side opening 18 is provided through which extends a transmission control cable or wire 20 enclosed by a sheath 21. The lower end of the cable or wire 20 is connected to a transmission external lever 22 for a transmission 24. Actuation of the transmission control cable, to be described later, rotates the transmission external lever, changing the settings of the transmission, e.g., forward drive, reverse and neutral. At the upper end of the steering column a steering member or wheel 26 is positioned and includes a hub 28 interposed between top and bottom covers 30 and 32.

Figure 2:
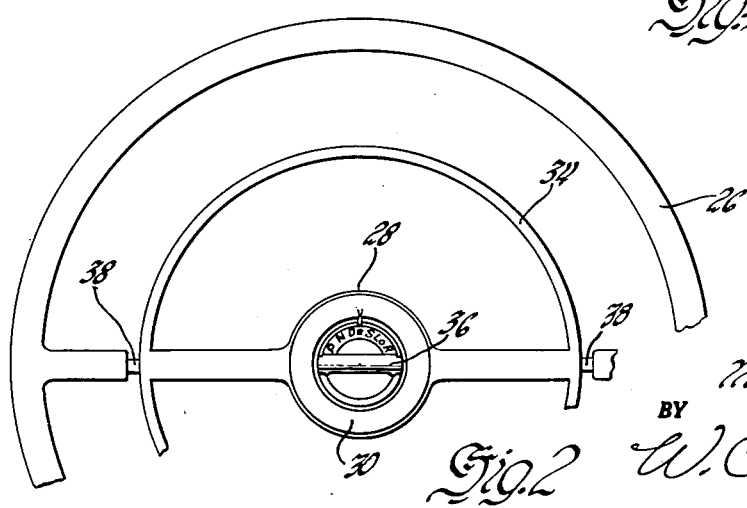
Figure 2 is a plan view of a steering wheel and a transmission control member.

As best shown by Figure 2, a horn ring 34 and a transmission control member 36 are concentrically disposed relative to the steering wheel 26. Spokes 38 on the steering wheel are suitably secured to the steering wheel hub 28 which is press fitted or otherwise attached to the upper end of the steering shaft 16. A lock nut 40 (Fig. 3) threadedly engages the steering shaft end and positions the hub 28 longitudinally.

Disposed above the hub 28 is a horn operating mechanism 42. This mechanism comprises the horn ring 34 which encloses steering wheel spokes 38 and terminates into a central shroud having a diameter approximating that of the top and bottom covers 30 and 32. Attached to and insulated from a flange end 43 of the horn ring shroud is an annular contact ring 44. Adjacent the contact ring 44 and connected to the hub 28 is a contact plate 45. An inwardly extending finger 46 on the contact ring 44 has attached thereto an insulator ring 47 abutting the contact plate 45 and a spring support ring 48 with the insulator ring 47 interposed between finger 46 and support ring 48. Finger 46 engages a plunger 50 which is slidable inside an insulating sleeve 52 disposed in a bore in the hub 28. A coil spring 54 urges the plunger 50 into engagement with the finger 46. A wire conductor 56, connected to a conventional horn device (not shown), is attached to the plunger 50.

For positioning the horn ring and exerting a bias upwardly to maintain the contact plate 45 and contact ring 44 out of engagement, a conical spring 58 is furnished. Conical spring 58 at the small lower end has an internal diameter fit with the spring support ring 48 and the opposite end has an external diameter fit with flange end 43 of the horn ring 34 providing the centering disposition. When the horn ring is depressed, spring 58 is compressed until contact plate 45 and contact ring 44 engage supplying a ground through steering wheel hub 28 and steering shaft 16 to the vehicle frame (not shown). When grounded, the electrical circuit for operating the horn blowing device is completed.

For actuating the transmission control wire 20 and accordingly the external lever 22, mechanism is provided including a transmission control shaft as hollow shift tube 62 located within the opening in the steering shaft 16. On the upper end of the shift tube 62 extending beyond the steering shaft a follower 64 is mounted for rotational movement relative to the shift tube but restrained from relative axial movement thereon by oppositely disposed snap rings 66 and 68. Follower 64 has radially extending drive arms 70 that coact with a guide surface as diagonal slots 72 (see Figure 4) in the transmission control member 36. These diagonal slots 72 are formed between connected flange and button ends 74 and 76, which together comprise the transmission control member 36. Flange end 74 is positioned radially and longitudinally by a retainer 78 connected to a sun gear 80. Retainer 78 houses a ball and spring detent 82, the ball of which engages spaced notches 84 on the flange end 74. These notches correspond to the transmission settings and coact with ball and spring detent 82 to hold the transmission control member in the setting selected.

Sun gear 80 is rotatably supported by a bearing nut 86 threadedly engaged on the steering shaft terminal end 88. An internally toothed member 90 is attached to sun gear 80 and has a tooth engaging a drive slot 92 in the follower 64.

To prevent rotational movement of the follower 64 and consequently rotational movement of the toothed member 90 and the sun gear 80, gearing, such as planetary gearing 93, is employed. The gearing 93 comprises a pinion shaft 94 journaled in a bore in the hub 28, which acts as a planet carrier, and pinions 96 and 98 attached to opposite ends thereof. Pinion 96 meshes with sun gear 80 and pinion 98 meshes with a sun gear 100 fixedly secured to the steering column 10 by screws 101. A bearing 102, interposed between gear 100 and the steering shaft 16, provides a rotatable support between the steering column 10 and shaft 16. Preferably, pinions 96 and 98 have the same number of teeth as do the sun gears 100 and 80. As a result, when the steering wheel hub 28 is rotated carrying with it the pinion shaft 94, the pinion 98 will roll around the fixed sun gear 100 and accordingly, the pinion 96 will roll around the sun gear 80 without transmitting any drive or inducing relative motion therebetween.

The axial movement of the shift tube 62 is transferred to the transmission control cable 20 through a slip ring 104 slidable on the steering shaft 16 and an interconnect pin 106 interposed between the slip ring 104 and the shift tube 62. A longitudinal opening 108 is furnished along the steering shaft 16 for guiding the interconnect pin 106 and limiting axial movement of the slip ring 104. The slip ring 104 includes an annular groove 110 arranged to slidably receive a carrier pin 112 which is fixedly connected to the end of the transmission control wire 20 by a set screw 114. Movement axially of the slip ring 104, therefore, will operate the control wire 20 and reposition the transmission external lever 22. Also, with this type arrangement the steering shaft 16 can be turned freely since the carrier pin 112 slides in the annular groove 110 as the slip ring 104 rotates with the steering shaft 16.

For lighting the visual transmission setting indicator, which includes a dial 115 attached to the transmission control member 36, a lighting device 116 is provided. The lighting device comprises a tubular housing 118, one end of which is enclosed by a pointer 120 and the other end of which is fixedly attached to the retainer 78. A bulb 121 is mounted in the housing 118 and engages a wire conductor 122 that extends from the housing 118 through the central opening in the shift tube 62 to an external terminal 124 mounted on the steering column 10. The terminal 124 is connected to a suitable electrical source, e.g., the vehicle battery.

The operation of the transmission control is substantially as follows: When it is desired to change the transmission setting, the transmission control member 36 is rotated until the indicator dial position desired lies opposite the fixed pointer 120. Since, as mentioned, the planetary gearing 93 maintains sun gear 80 and consequently, internally toothed member 90 stationary, the follower member 64 cannot rotate with the transmission control member 36. Therefore, the diagonal slots 72 cause the follower 64 and, because of snap rings 66 and 68, the shift tube 62 to be moved axially. As a result, slip ring 104 through the drive connection of interconnect pin 106 with the shift tube 62 will be moved axially on the shift tube and carry with it carrier pin 112 and transmission control wire 20. This combined action rotates the external lever 22 to the desired position reconditioning the transmission in a manner well-known for the desired new setting. The steering wheel 26 can still be turned without interfering with the described operation of the transmission control member 36.

Furthermore, rotation of the steering wheel simply carries the pinion shaft 94 for the planetary gearing 93 with it but does not cause a release or change of the stationary position of sun gear 80 and internally toothed member 90. This provides a very convenient method of preventing rotational movement of the internally toothed member 90 and follower 64 without the necessity of having some holding member carried around the outer diameter of the steering wheel and fixedly attached to the steering column or some other part of the vehicle. In other words, a satisfactory holding means is provided without interfering with rotation of the steering wheel by making the connection through the steering wheel hub instead of by specially constructed mechanisms extending around the steering wheel.

I claim:

1. In combination with a steering column, a steering shaft rotatably mounted within the steering column, a transmission control shaft disposed within the steering shaft, a rotatably mounted transmission control member positionable in a plurality of transmission settings, a steering wheel including a hub portion secured to the steering shaft between an end of the steering column and the transmission control member, means revolvable with the steering wheel for restraining rotation of the transmission control shaft relative to the steering column, and a guide surface on the transmission control member for shifting the transmission control shaft axially upon rotation of the transmission control member with the transmission control shaft prevented from rotation by the restraining means.

2. In combination with a steering column, steering and transmission control shafts rotatably mounted within the steering column, a rotatably mounted transmission control member positionable in a plurality of transmission settings, a steering wheel including a hub portion secured to the steering shaft between an end of the steering column and the transmission control member, means restraining rotation of the transmission control shaft relative to the steering column, and a guide surface on the transmission control member for shifting the transmission control shaft axially upon rotation of the transmission control member with the transmission control shaft prevented from rotation by the restraining means.

3. In combination with a steering column, a steering shaft rotatably mounted within the steering column, a transmission control shaft disposed within the steering shaft, a rotatably mounted transmission control member positionable in a plurality of transmission settings, a steering wheel including a hub portion secured to the steering shaft between an end of the steering column and the transmission control member, restraining means between the transmission control shaft and the steering column and extending through and revolvable with the steering wheel to prevent rotation of the transmission control shaft, and a guide surface on the transmission control member for shifting the transmission control shaft axially upon rotation of the transmission control member with the transmission control shaft prevented from rotation by the restraining means.

4. In combination with a steering column, a steering shaft rotatably mounted within the steering column, a transmission control shaft disposed within the steering shaft, a rotatably mounted transmission control member positionable in a plurality of transmission settings, a steering wheel including a hub portion secured to the steering shaft between an end of the steering column and the transmission control member, gearing means between the transmission control shaft and the steering column and extending through the steering wheel to prevent rotation of the transmission control shaft, and a guide surface on the transmission control member for shifting the transmission control shaft axially upon rotation of the transmission control member with the transmission control shaft restrained from rotation by the gearing means.

5. In combination with a steering column, a steering shaft rotatably mounted within the steering column, a transmission control shaft disposed within the steering shaft, a rotatably mounted transmission control member positionable in a plurality of transmission settings, a steering wheel including a hub portion secured to the steering shaft between an end of the steering column and the transmission control member, planetary gearing means between the transmission control shaft and the steering column and extending through the steering wheel to prevent rotation of the transmission control shaft, and a guide surface on the transmission control member for shifting the transmission control shaft axially upon rotation of the transmission control member with the transmission control shaft prevented from rotation by the planetary gearing means.

6. In combination with a steering column, a steering shaft rotatably mounted within the steering column, a transmission control shaft disposed within the steering shaft, a rotatably mounted transmission control member positionable in a plurality of transmission settings, a steering wheel including a hub portion secured to the steering shaft between an end of the steering column and the transmission control member, planetary gearing for preventing rotation of the transmission control shaft and for permitting free rotation of the steering wheel comprising a first gear drive-connected to the transmission control shaft, a second gear positioned on the opposite side of the steering wheel from the first gear and restrained from rotation, a pinion shaft rotatably mounted by the steering wheel, a pinion attached to each end of the pinion shaft, one pinion meshing with the first gear and the other pinion meshing with the second gear, and a cam connection between the transmission control member and the transmission control shaft for shifting the transmission control shaft axially with the planetary gearing restraining the transmission control shaft fror rotation.

7. In combination with a steering column, a steering shaft rotatably mounted within the steering column, a transmission control shaft rotatably mounted within the steering shaft, a transmission control member rotatably supported by the steering shaft and positionable in a plurality of transmission settings, a steering wheel including a hub portion secured to the steering shaft between an end of the steering column and the transmission control member, planetary gearing for preventting rotation of the transmission control shaft and for permitting free rotation of the steering wheel, the planetary gearing comprising a first gear drive-connected to the transmission control shaft, a second gear disposed on the opposite side of the steering wheel hub portion from the first gear and attached to the steering column to prevent rotation thereof, a pinion shaft rotatably mounted by the steering wheel hub portion, a pinion attached to each of said ends of the pinion shaft, one pinion meshing with the first gear and the other pinion meshing with the second gear, and a cam connection between the transmission control member and the transmission control shaft for shifting the transmission control shaft axially with the transmission control shaft restrained from rotation by the planetary gearing.

8. Apparatus of the character described for controlling a transmission comprising, in combination, a steering column, a steering shaft rotatably mounted within the steering column, a transmission control shaft disposed within the steering shaft, a rotatably mounted transmission control member positionable in a plurality of transmission settings, a steering wheel including a hub portion secured to the steering shaft between an end of the steering column and the transmission control member, gearing means between the transmission control shaft and the steering column and extending through the steering wheel to prevent rotation of the transmission control shaft, a guide surface on the transmission control member for shifting the transmission control shaft axially upon rotation of the transmission control member with the transmission control shaft prevented from rotation by the gearing means, a transmission connected element shiftable for controlling the transmission, and means interconnecting the transmission control shaft and the shift element through the steering shaft.

9. Apparatus of the character described for controlling a transmission comprising, in combination, a steering column, a steering shaft rotatably mounted within the steering column, a transmission control shaft disposed within the steering shaft, a rotatably mounted transmission control member positionable in a plurality of transmission settings, a steering wheel including a hub portion secured to the steering shaft between an end of the steering column and the transmission control member, planetary gearing means between the transmission control shaft and the steering column and extending through the steering wheel to prevent rotation of the transmission control shaft, a guide surface on the transmission control member for shifting the transmission control shaft axially upon rotation of the transmission control member with the transmission control shaft prevented from rotation by the planetary gearing means, a transmission connected element shiftable for controlling the transmission, and a transfer member slidable on the steering shaft and interconnecting the transmission connected element and the transmission control shaft through the steering shaft.

10. Apparatus of the character described for controlling a transmission comprising, in combination, a steering column, a steering shaft rotatably mounted within the steering column, a transmission control shaft disposed within the steering shaft, a rotatably mounted transmission control member positionable in a plurality of transmission settings, a steering wheel including a hub portion secured to the steering shaft between an end of the steering column and the transmission control member, planetary gearing for preventing rotation of the transmission control shaft and for permitting free rotation of the steering wheel, the planetary gearing comprising a first gear drive connected to the transmission control shaft, a second gear positioned on the opposite side of the steering wheel from the first gear and restrained from rotation, a pinion shaft rotatably mounted by the steering wheel, a pinion attached to each end of the pinion shaft, one pinion meshing with the first gear and the other pinion meshing with the second gear, a cam connection between the transmission control member and the transmission control shaft for shifting the transmission control shaft axially with the planetary gearing restraining the transmission control shaft from rotation, the steering shaft including an opening adjacent an end of the transmission control shaft, a transmission connected cable for controlling the transmission, a transfer member slidable on the steering shaft, an interconnect element attached to the transmission control shaft and the transfer member and extending through the opening in the steering shaft to cause the transfer member to be axially movable on the steering shaft with the transmission control shaft and rotatable with the steering shaft, a carrier member connected to the cable and mounted on the transfer member for axial movement therewith during axial movement of the transfer member and slidable movement relative to the transfer member during rotation of the transfer member.

11. Apparatus of the character described for controlling a transmission comprising, in combination, a steering column, a steering shaft rotatably mounted within the steering column, a transmission control shaft disposed within the steering shaft, a rotatably mounted transmission control member positionable in a plurality of transmission settings, a steering wheel including a hub portion secured to the steering shaft between an end of the steering column and the transmission control member, restraining means revolvable with the steering wheel for preventing rotation of the transmission control shaft, means coacting with the restraining means for transforming rotational movement of the transmission control member to axial movement of the transmission control shaft, a transmission setting indicator including indicator dial and pointer elements disposed on the same side of the steering wheel as the transmission control member, one of the indicator elements being movable with the transmission control member and the other of the indicator elements being prevented from movement by the restraining means, a transmission connected element shiftable for controlling the transmission, and means interconnecting the transmission control shaft and the transmission connected element through the steering shaft.

12. Apparatus of the character described for controlling a transmission comprising, in combination, a steering column, a steering shaft rotatably mounted within the steering column, a transmission control shaft disposed within the steering shaft, a rotatably mounted transmission control member positionable in a plurality of transmission settings, a steering wheel including a hub portion secured to the steering shaft between an end of the steering column and the transmission control member, means revolvable with the steering wheel restraining rotation of the transmission control shaft relative to the steering column, a transmission setting indicator including indicator dial and pointer elements disposed on the same side of the steering wheel as the transmission control member, one of the indicator elements being movable with the transmission control member and the other of the indicator elements being prevented from rotation by the restraining means, a guide surface on the transmission control member for shifting the transmission control shaft axially upon rotation of the transmission control member with the transmission control shaft prevented from rotation by the restraining means, a transmission connected element shiftable for controlling the transmission, and a transfer member slidable on the steering shaft, the transfer member interconnecting the transmission connected element and the transmission control shaft through the steering shaft.

13. In combination with a steering column; a steering shaft rotatably mounted within the steering column; a visual transmission setting indicator including indicator dial and pointer elements; a steering wheel including a hub portion secured to the steering shaft between an end of the steering column and the indicator; a planetary gearing including a planet pinion carrier rotatable with the steering wheel, a pinion supported on the planet pinion carrier, first and second gears coacting with the pinion, the first gear being joined to one of the indicator elements, and means for holding the second gear stationary so that said one of the indicator elements is held stationary without interfering with the turning of the steering wheel; and transmission control means positioned on the same side of the steering wheel as the indicator and having the other of the indicator elements movable therewith, the transmission control means being arranged to extend through the steering wheel so as to be connected to the transmission.

14. In combination with a steering column, transmission control and steering shafts rotatably mounted within the steering column, a visual transmission setting indicator including indicator dial and pointer elements, a transmission control member having one of the indicator elements movable therewith, a steering wheel including a hub portion secured to the steering shaft, the hub portion being so disposed as to have both the indicator and the transmission control member on one side and the steering column on the other side, and planetary gearing both for connecting the other of the indicator elements to the steering column through the steering wheel so as to hold said other of the indicator elements stationary without interfering with the turning of the steering wheel and for drive connecting through the steering wheel the transmission control member so as to permit independent movement of the steering and transmission control shafts.

15. In combinattion with a steering column, transmission control and steering shafts rotatably mounted within the steering column, a steering wheel including a hub portion secured to the upper end of the steering shaft, a visual transmission setting indicator including indicator dial and pointer elements both positioned on the upper side of the hub portion of the steering wheel, a transmission control member disposed on the same side of the steering wheel as the indicator and having one of the indicator element movable therewith, and planetary gearing both for connecting the other of the indicator elements to tthe steering column through the steering wheel so as to hold said other of the indicator elements stationary without interfering with the turning of the steering wheel and for drive connecting through the steering wheel the transmission control shaft and the transmission control members as as to permit independent movement of the steering and transmission control shafts, the planetary gearing including a planet pinion carrier rotatably supported by the steering wheel hub portion, a pinion supported on the carrier, and gears joined, respectively, to said other of the indicator elements and the steering column and coacting with the pinion.

References Cited in the file of this patent

UNITED STATES PATENTS

| | | |
|---|---|---|
| 1,430,229 | Heath | Sept. 26, 1922 |
| 1,815,871 | Douglas | July 21, 1931 |
| 1,828,685 | Schofield | Oct. 20, 1931 |
| 2,699,034 | Maire | Jan. 11, 1955 |
| 2,896,471 | Hause | July 28, 1959 |

FOREIGN PATENTS

| | | |
|---|---|---|
| 195,704 | Great Britain | Mar. 23, 1923 |
| 773,517 | France | Sept. 3, 1934 |